US012675259B2

(12) United States Patent
Wolczko

(10) Patent No.: US 12,675,259 B2
(45) Date of Patent: *Jul. 7, 2026

(54) SPACE- AND TIME-EFFICIENT ENUMERATIONS

(71) Applicant: Oracle International Corporation, Redwood City, CA (US)

(72) Inventor: Mario Wolczko, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,337

(22) Filed: Dec. 22, 2023

(65) Prior Publication Data

US 2024/0126512 A1      Apr. 18, 2024

Related U.S. Application Data

(63) Continuation of application No. 17/664,835, filed on May 24, 2022, now Pat. No. 11,886,838.

(51) Int. Cl.
G06F 9/44 (2018.01)
G06F 8/20 (2018.01)
G06F 8/41 (2018.01)
G06F 9/455 (2018.01)

(52) U.S. Cl.
CPC ................ G06F 8/24 (2013.01); G06F 8/436 (2013.01); G06F 8/441 (2013.01); G06F 9/4552 (2013.01)

(58) Field of Classification Search
None
See application file for complete search history.

(56) References Cited

U.S. PATENT DOCUMENTS

| | | | |
|---|---|---|---|
| 6,918,126 B1 * | 7/2005 | Blais | G06F 9/4488 |
| | | | 717/148 |
| 8,527,942 B2 | 9/2013 | Foti et al. | |
| 2004/0049764 A1 | 3/2004 | Bloch et al. | |
| 2005/0193373 A1 | 9/2005 | Wannamaker et al. | |
| 2008/0162414 A1 | 7/2008 | Kirk et al. | |
| 2014/0137022 A1 | 5/2014 | Kasper et al. | |

(Continued)

FOREIGN PATENT DOCUMENTS

| | | |
|---|---|---|
| CN | 113900659 | 1/2022 |

*Primary Examiner* — Insun Kang
(74) *Attorney, Agent, or Firm* — Robert C. Kowert; Kowert, Hood, Munyon, Rankin & Goetzel, P.C.

(57) ABSTRACT

Systems, computer instructions and computer-implemented methods are disclosed for implementing space- and time-efficient enumerations. An instance of an enumeration class may be created with a constant, plurality of enumerations. A plurality of objects corresponding to the respective enumerations may be stored in memory along with a lookup table indexed by respective ordinal values of the plurality of enumerations, the lookup table including respective references to the stored objects of the instantiated enumeration class. A reference to an enumeration may be stored in a memory location by storing an ordinal value of the enumeration. A determination may then be made to convert a stored ordinal value to a reference to an object, and responsive to the determination, the ordinal value may be loaded and used as an index into the lookup table to obtain the reference to the object corresponding to the enumeration.

20 Claims, 7 Drawing Sheets

(56) References Cited

U.S. PATENT DOCUMENTS

| 2016/0132544 | A1  | 5/2016  | Scotti et al. |              |
|--------------|-----|---------|---------------|--------------|
| 2017/0046386 | A1* | 2/2017  | Kirk          | G06F 16/24542 |
| 2020/0133677 | A1* | 4/2020  | Wallach       | G06F 12/1441 |
| 2023/0385028 | A1  | 11/2023 | Wolczko       |              |

* cited by examiner

```
200 public enum compass { NORTH, SOUTH, EAST, WEST }
```

*FIG. 2A*

```
210  final class compass extends java.lang.Enum<compass > {
220      public static final compass NORTH = new compass("NORTH", 0),
230                                  SOUTH = new compass("SOUTH", 1),
240                                  EAST  = new compass("EAST",  2),
250                                  WEST  = new compass("WEST",  3);
260      public static final compass[] $VALUES = ( NORTH, SOUTH, EAST, WEST};
```

*FIG. 2B*

<u>300</u>    class myClass { int i; long l; compass e; byte b; }

*FIG. 3A*

| 310a | header |
|------|--------|
| 320a | i |
| 330a | l |
|      |  |
| 340a | e |
| 350a  b | unused |

32 bit

| 310b | header |  |  |
|------|--------|---|---|
| 330b | l |  |  |
| 340b | e |  |  |
| 320b | i | 350a  b | unused |

64 bit

*FIG. 3B*

| 310a | header |
|------|--------|
| 320a | i |
| 330a | l |
|      |  |
| 350a b | 340a e | unused |

32 bit

| 310b | header |  |  |  |
|------|--------|---|---|---|
| 330b | l |  |  |  |
| 320b | i | 350a  b | 340b  e | unused |

64 bit

*FIG. 3C*

```
410  getField   reference myClassInstance, offset myEnum, dest localReference
420  getField   localReference, offset value, dest ordinal
430  Compare    ordinal, constant NORTH_ordinal
     ...
```

*FIG. 4A*

```
440   getField   reference myClassInstance, offset myEnum, dest ordinal
450   Compare    ordinal, constant NORTH_ordinal
      ...
```

*FIG. 4B*

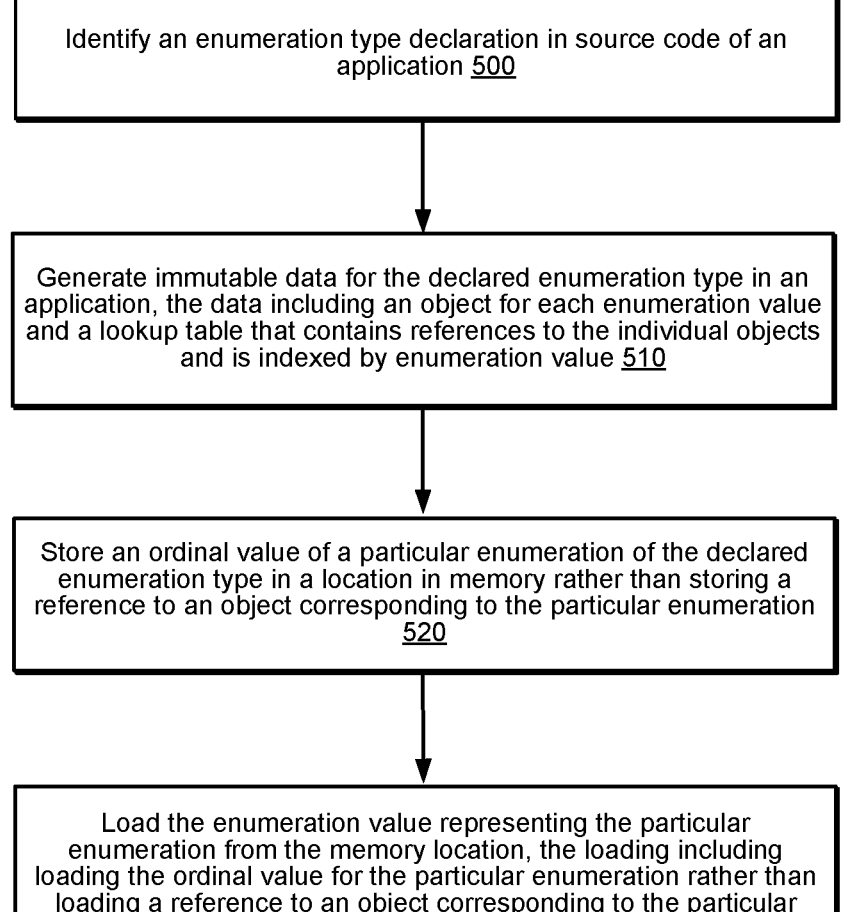

Identify an enumeration type declaration in source code of an application 500

Generate immutable data for the declared enumeration type in an application, the data including an object for each enumeration value and a lookup table that contains references to the individual objects and is indexed by enumeration value 510

Store an ordinal value of a particular enumeration of the declared enumeration type in a location in memory rather than storing a reference to an object corresponding to the particular enumeration 520

Load the enumeration value representing the particular enumeration from the memory location, the loading including loading the ordinal value for the particular enumeration rather than loading a reference to an object corresponding to the particular enumeration and loading the ordinal value from the object 530

*FIG. 5*

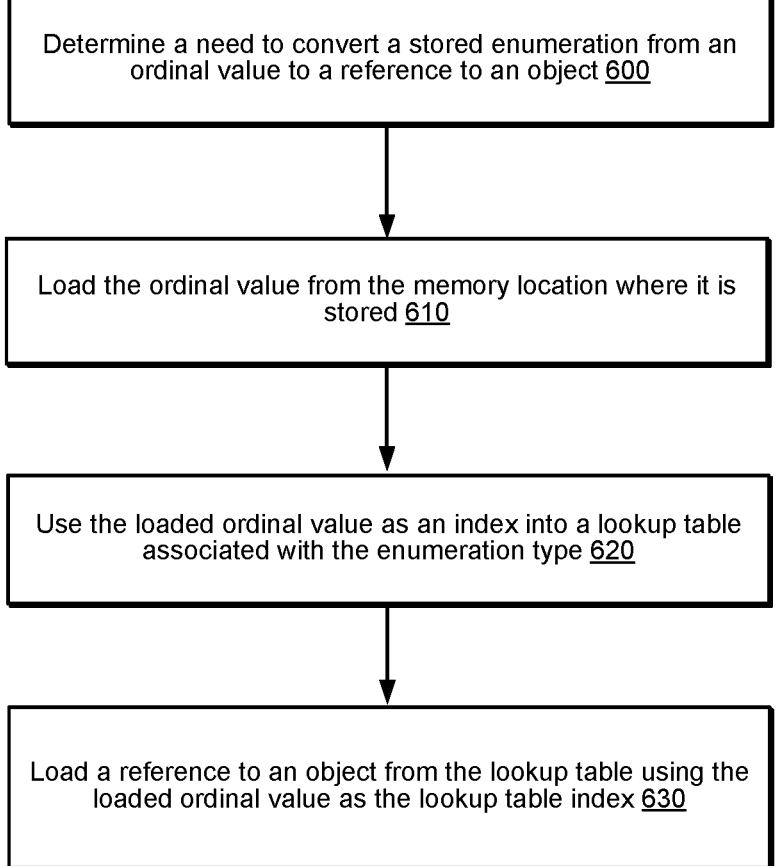

Determine a need to convert a stored enumeration from an ordinal value to a reference to an object 600

Load the ordinal value from the memory location where it is stored 610

Use the loaded ordinal value as an index into a lookup table associated with the enumeration type 620

Load a reference to an object from the lookup table using the loaded ordinal value as the lookup table index 630

FIG. 6

SPACE- AND TIME-EFFICIENT ENUMERATIONS

PRIORITY APPLICATION

This application is a continuation of U.S. patent application Ser. No. 17/664,835, filed May 24, 2022, which is hereby incorporated by reference herein in its entirety.

BACKGROUND

Field of the Disclosure

This disclosure relates generally to computer hardware and software, and more particularly to systems and methods for implementing enumerations in application runtimes.

Description of the Related Art

Enumerations are a pervasive feature in modern application development languages as they support symbolic representations, or named constants, of ordinal values, leading to greater readability and clarity of source code as well as improved debugging during software development. Traditionally, these ordinal values may be represented as integral data types of a fixed or varying integral width, mostly commonly the natural integer width of the underlying computer architecture. Modern languages, however, often implement enumerations as classes, leading to reduced code efficiency and greater memory usage.

SUMMARY

Systems and methods are disclosed for implementing space- and time-efficient enumerations. An instance of an enumeration class may be created with a constant, plurality of enumerations. The values of the class instance may be represented both as objects and ordinal values. First, a plurality of objects corresponding to the respective enumerations may be stored in memory along with a lookup table indexed by respective ordinal values of the plurality of enumerations, the lookup table including respective references to the stored objects of the instantiated enumeration class.

A reference to an enumeration may be stored in a memory location by storing an ordinal value of the enumeration. This ordinal value may require a smaller memory location than an object reference. A determination may then be made to convert a stored ordinal value to an object reference, and responsive to the determination, the ordinal value may be loaded and used as an index into the lookup table to obtain the reference to the object corresponding to the enumeration.

BRIEF DESCRIPTION OF THE DRAWINGS

FIG. 2A is a block diagram illustrating a declaration of an enumeration, in various embodiments.

FIG. 2B is a block diagram illustrating an implementation of a declared enumeration, in various embodiments.

FIG. 3A is a block diagram illustrating a declaration of an example class including an enumeration, in various embodiments.

FIG. 3B is a block diagram illustrating conventional data layouts for an example class including an enumeration, in various embodiments.

FIG. 3C is a block diagram illustrating possible data layouts for an example class including a space- and time-efficient enumeration, in various embodiments.

FIG. 4A is a block diagram illustrating conventional byte code to access an enumeration, in various embodiments.

FIG. 4B is a block diagram illustrating possible byte code to access a space- and time-efficient enumeration, in various embodiments.

FIG. 5 is a flow diagram illustrating the creation of a space- and time-efficient enumeration, in various embodiments.

FIG. 6 is a flow diagram illustrating conversion of a stored ordinal value of a space- and time-efficient enumeration to a reference to an object, in various embodiments.

Figure 1:
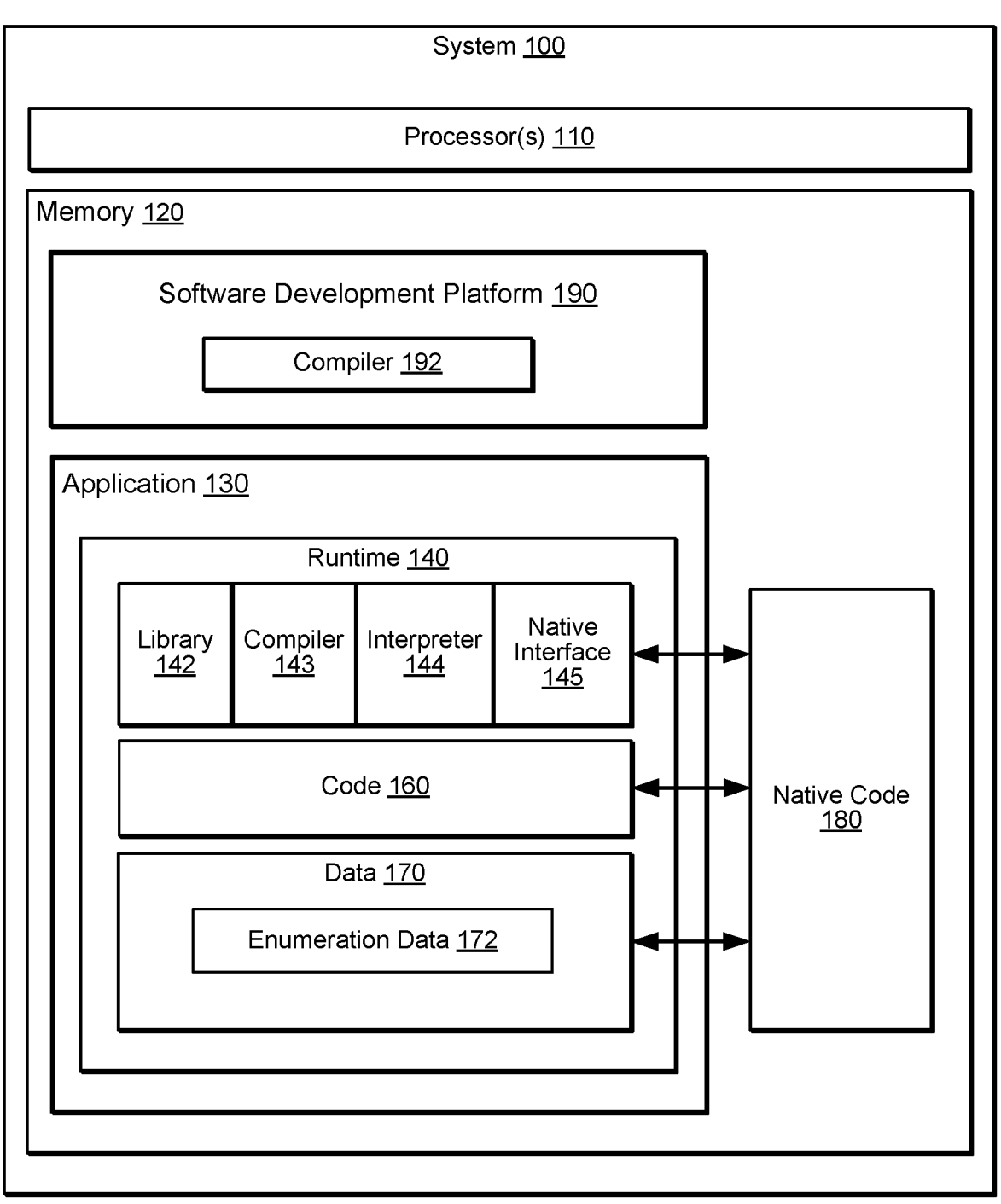
FIG. 1 is a block diagram illustrating a system that implements space- and time-efficient enumerations, in various embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Enumerations are a pervasive feature in modern application development languages as they support symbolic representations, or named constants, of ordinal values, leading to greater readability and clarity of source code as well as improved debugging during software development. Traditionally, these ordinal values may be represented as integral data types of a fixed or varying integral width, mostly commonly the natural integer width of the underlying computer architecture. Modern object-oriented languages, however, often implement enumerations as classes, leading to reduced code efficiency and greater memory usage. Rather than implement enumerations as integers and enumeration types as source code abstractions that are not output to executable code, object-oriented languages may represent individual enumeration types as concrete data in executable code, with these individual enumeration types including statically defined objects for each enumeration of the enumeration type. Then, individual enumerations may then be implemented as references to these enumeration objects rather than as integral types. This leads to greater memory usage, as enumerations rarely require as much memory to store as a memory reference requires. Furthermore, the loading of the ordinal value for an enumeration becomes less efficient, as the ordinal value must be loaded from the enumeration object rather than be loaded directly from a memory location itself.

FIG. 1 is a block diagram illustrating a system that implements space- and time-efficient enumerations, in various embodiments. The System 100 may include one or more Processors 110 capable executing an Application 130 contained in a Memory 120. The Application 130 may include a Runtime 140, where the Runtime 140 may in some embodiments be a Managed Runtime that may execute within a Virtual Machine (not shown) and may include a Library 142 and a Bytecode Executive that may further include a Compiler 143 and an Interpreter 144 for executing Code 160. The Application may further include Data 170 that includes Enumeration Data 172. In addition, a Native Interface 145 may be provided in some embodiments to allow Native Code 180 developed in other programming languages and executing outside the Runtime 140 to interface with the Code 160 and access Data 170 include the Enumeration Data 172.

Finally, in some embodiments, various aspects of space- and time-efficient enumerations described herein may be implemented entirely within the compiler and interpreter of the Runtime 140 in some embodiments, where in other embodiments some aspects of space- and time-efficient enumerations may be implemented using a Compiler 192 of a Software Development Platform 190 separate from the Runtime 140. While this Software Development Platform 190 is shown within the same System 100 as the Application 130 for simplicity, it should be understood that Software Development Platform 190 and Application 130 may execute in different physical systems, and indeed the Software Development Platform 190 may execute in the System 100 while the Application may be deployed in multiple other systems such as described below in FIG. 7. Thus, the Software Development Platform 190 and Application 130 may execute on the same System 100 or on different systems and the System 100 as shown in FIG. 1 is not intended to be limiting.

It should be further understood that, in some embodiments, the Code 160 may include native executable code in some embodiments, where the Compiler 143 and Interpreter 144 may be absent. In such embodiments, code compilation steps may be performed entirely within the Software Development Platform 190. Thus, in various embodiments the collective aspects of space- and time-efficient enumerations described herein may be implemented using the combined capabilities of the Software Development Platform 190 and Runtime 140, including being implemented entirely within the Software Development Platform 190 in some embodiments, entirely with the Runtime 140 in other embodiments, and distributed in various ways between the Software Development Platform 190 and Runtime 140 in still other embodiments.

FIG. 2A is a block diagram illustrating a declaration of an enumeration, in various embodiments. In the provided example, the well-known Java' programming language is used, although any object-oriented language may also be used and the use of the Java™ programming language in the example is not intended to be limiting. Shown in 200 is a declaration of an instance of an enumeration creating a specific enumeration type named compass. The compass enumeration type may include four possible enumerations, named NORTH, SOUTH, EAST and WEST. As shown in FIG. 2B below, this enumeration declaration may be associated with a creation of specific data in the resulting application, such as within the Data 170 of the Application 130 as shown in FIG. 1.

FIG. 2B is a block diagram illustrating an implementation of a declared enumeration, in various embodiments. In the provided example, the well-known Java™ programming language is used, although any object-oriented language may also be used and the use of the Java™ programming language in the example is not intended to be limiting. As shown in FIG. 2A above, a declaration of an instance of an enumeration creating a specific enumeration type named compass. To provide an implementation of this declared enumeration, in 210 a class named compass is defined that incorporates the features of the java class enum. Included in the compass class may be four objects shown in 220, 230, 240 and 250, in some embodiments. These may be the following objects: NORTH with ordinal value 0, as indicated in 220, SOUTH with ordinal value 1, as indicated in 230, EAST with ordinal value 2, as indicated in 240 and WEST with ordinal value 3, as indicated in 250. Additionally, a lookup table compass H may be created as shown in 260, the table indexed by ordinal value and containing references to the objects NORTH, SOUTH, EAST and WEST.

It should be understood that the enumeration shown in FIGS. 2A and 2B is merely an example and that enumerations may have any number of named values and ordinal values. Furthermore, the compass class may have additional data and/or methods that are not shown. The example shown is not intended to be limiting and any additional details not shown are merely omitted for clarity. Furthermore, it should be understood that, while the compass class as shown may be limited to the ordinal values 0 through 3, and that these ordinal values would be stored as integer values within the respective objected that may be created in statements 220, 230, 240 and 250, any integral storage with a two or more bits of storage capacity would be suitable for storing the ordinal value of a particular enumeration of the compass class, in some embodiments. Furthermore, it should be understood that enumeration classes with more of fewer ordinal values may require more or fewer than two bits of storage, and that the above example is not intended to be limiting.

FIG. 3A is a block diagram illustrating a declaration of an example class including an enumeration, in various embodiments. In the provided example, the well-known Java™ programming language is used, although any object-oriented language may also be used and the use of the Java™ programming language in the example is not intended to be limiting. Shown in 300 is a declaration of an instance of a class named myClass, in some embodiments. This class may include a number of data fields including an integer i, a long integer l, an enumeration e and a byte integer b. In the example programming language, the integral types i, l and b may be predefined to have storage requirements of four bytes, eight bytes and one byte, respectively. Typically, the enumeration type in the example may require storage for a reference, or pointer or memory address, so that an object of an enumeration type may be stored. In the Java™ programming language, and in other object-oriented programming languages, the resulting runtime, such as the Runtime 140 as shown in FIG. 1, may control the data layout of the resulting data objects of the class. Examples of such layouts, for conventional runtimes and for runtimes providing space- and time-efficient enumerations, are shown in FIGS. 3B and 3C below.

FIG. 3B is a block diagram illustrating conventional data layouts for an example class including an enumeration, in various embodiments. The example class illustrated depends on the example class definition of FIG. 3A above. Two data layouts are shown, one for a hosting computer architecture of 32 bits and another for a hosting computer architecture of 64 bits. These layouts are merely examples and are not intended to be limiting. Furthermore, objects with such layouts may be created by a compiler such as the Compiler 143 as shown in FIG. 1, a Compiler 192 of the Software Development Platform 190 as shown in FIG. 1, or an interpreter such as the Interpreter 144 as shown in FIG. 1, in various embodiments. Furthermore, these example layouts may be used to create objects stored in application data such as on a stack, a heap, or in statically allocated data memory. Examples of such data memory are Data 170 as shown in FIG. 1. This data may be subsequently accessed in the layouts shown by program code, such as the Code 160 of FIG. 1, by libraries such as the Library 142 of FIG. 1 or by native code through a native interface such as the Native Code 180 and Native Interface 145 as shown in FIG. 1.

As discussed above in regard to FIG. 3A, In the example programming language, the integral types i, l and b may be predefined to have storage requirements of four bytes, eight bytes and one byte, respectively. In a hosting computer architecture of 32 bits, an object of the example class may have a header 310a of one 32-bit word, the integer i 320a of one 32-bit word, the long integer l 330a of two 32-bit words, a reference to store enumeration e 340a of one 32-bit word and finally the byte integer b 350a of one 8-bit word. It should be noted that, because the hosting computer architecture is 32 bit, the reference to store enumeration e may use one 32-bit word. It should be further noted that the structure contains unused data bytes at 350a and may contain unused bits (not shown) in the header 310a.

In a hosting computer architecture of 64 bits, an object of the example class may have a header 310b of one 64-bit word, the long integer l 330b of one 64-bit word, a reference to store enumeration e 340b of one 64-bit word, the integer i 320b of one 32-bit word and finally the byte integer b 350b of one 8-bit word. It should be noted that, because the hosting computer architecture is 64 bit, the reference to store enumeration e may use one 64-bit word. It should be further noted that the structure contains unused data bytes at 350a and may contain unused bits (not shown) in the header 310a.

It should be understood that these data layouts are merely typical examples that may comply with common 32-bit and 64-bit computer architectures and that any number of compliant data layouts may be imagined, in various embodiments.

FIG. 3C is a block diagram illustrating possible data layouts for an example class including a space- and time-efficient enumeration, in various embodiments. The example class illustrated depends on the example class definition of FIG. 3A above. Two data layouts are shown, one for a hosting computer architecture of 32 bits and another for a hosting computer architecture of 64 bits. These layouts are merely examples and are not intended to be limiting. Furthermore, objects with such layouts may be created by a compiler such as the Compiler 143 as shown in FIG. 1, a Compiler 192 of the Software Development Platform 190 as shown in FIG. 1, or an interpreter such as the Interpreter 144 as shown in FIG. 1, in various embodiments. Furthermore, these example layouts may be used to create objects stored in application data such as on a stack, a heap, or in statically allocated data memory. Examples of such data memory are Data 170 as shown in FIG. 1. This data may be subsequently accessed in the layouts shown by program code, such as the Code 160 of FIG. 1, by libraries such as the Library 142 of FIG. 1 or by native code through a native interface such as the Native Code 180 and Native Interface 145 as shown in FIG. 1.

As discussed above in regard to FIG. 3A, In the example programming language, the integral types i, l and b may be predefined to have storage requirements of four bytes, eight bytes and one byte, respectively. Furthermore, the enumeration e is of type compass as discussed above in FIGS. 2A and 2B. The compass enumeration type has an ordinal range of 0-3, thus requiring only two bits of storage rather than a computer word of storage than may otherwise be required to storage a reference, pointer or memory address. It should be understood that the compass enumeration used in the present example is not intended to be limiting and enumerations with wider or narrower enumeration ranges may be used, although in the example layouts below, it is a assumed that the ordinal range may be stored in no more than three bytes.

In a hosting computer architecture of 32 bits, an object of the example class may have a header 310a of one 32-bit word, the integer i 320a of one 32-bit word, the long integer l 330a of two 32-bit words, the byte integer b 350a of one 8-bit byte and finally an ordinal value e requiring two bits of storage. It should be noted that the structure contains unused data bytes at 350a and may contain unused bits (not shown) in the header 310a. It should be further noted that, in the event the header 310a has sufficient unused bits, the enumeration e 340b may be stored in an unused portion of the header 310a rather than in the unused portion of the byte integer b 350a, in some embodiments.

In a hosting computer architecture of 64 bits, an object of the example class may have a header 310b of one 64-bit word, the long integer l 330b of one 64-bit word, the integer i 320b of one 32-bit half-word, the byte integer b 350b of one 8-bit byte and finally an ordinal value e requiring two bits of storage. It should be noted that the structure contains unused data bytes at 350b and may contain unused bits (not shown) in the header 310b. It should be further noted that, in the event the header 310b has sufficient unused bits, the enumeration e 340b may be stored in an unused portion of the header 310b rather than in the unused portion of the byte integer b 350b, in some embodiments.

It should be understood that these data layouts are merely typical examples that may comply with common 32-bit and 64-bit computer architectures and that any number of compliant data layouts may be imagined, in various embodiments.

FIG. 4A is a block diagram illustrating conventional byte code to access an enumeration, in various embodiments. To obtain an ordinal value of an enumeration, a code generator, such as the Compiler 143, Interpreter 144 or Compiler 192 of a Software Development Platform 190 as shown in FIG. 1, may first emit a getField instruction 410. This instruction may be provided at least two operands in some embodiments, a first operand including a reference to an object which contains a reference to an enumeration and a second operand providing an offset within the object where the reference is stored. The instruction may, in some embodiments, may also include a destination operand as indicated in the example as the localReference.

Once the localReference is obtained, the code generator may then emit a second getField instruction 420, in some embodiments, that includes a first operation of the local reference, an offset operand that defines where the ordinal value is stored within the enumeration object, and a destination operand which is shown in the example as ordinal.

Once the ordinal is obtained, the code generator may emit any number of instructions 430 suitable to use the ordinal value. In the example, a compare instruction is used to determine if the ordinal corresponds to the ordinal value of the predefined NORTH enumeration.

It should be understood that these instructions are merely typical examples that may comply common computer architectures or virtual machine architectures, in various embodiments, and is not intended to be limiting.

FIG. 4B is a block diagram illustrating possible byte code to access a space- and time-efficient enumeration, in various embodiments. To obtain an ordinal value of an enumeration, a code generator, such as the Compiler 143, Interpreter 144 or Compiler 192 of a Software Development Platform 190 as shown in FIG. 1, may emit a getField instruction 440. This instruction may be provided at least two operands in some embodiments, a first operand including a reference to an object which contains an ordinal value of an enumeration and a second operand providing an offset within the object where the ordinal value is stored. The instruction may, in some embodiments, may also include a destination operand as indicated in the example as the ordinal.

Once the ordinal is obtained, the code generator may emit any number of instructions 450 suitable to use the ordinal value. In the example, a compare instruction is used to determine if the ordinal corresponds to the ordinal value of the predefined NORTH enumeration.

It should be understood that these instructions are merely typical examples that may comply common computer architectures or virtual machine architectures, in various embodiments, and is not intended to be limiting.

FIG. 5 is a flow diagram illustrating the creation of a space- and time-efficient enumeration, in various embodiments. First, as shown in 500, an enumeration type declaration such as the enumeration type declarations of FIGS. 2A and 2B, may be identified in source code for an application, such as the Application 130 of FIG. 1. In some embodiments, this may be performed by a compiler such as a Compiler 192 of a Software Development Platform 190 as shown in FIG. 1 while in other embodiments it may be performed within an application runtime such as by a Compiler 143 or Interpreter 144 as shown in FIG. 1.

Responsive to identifying an enumeration type declaration, as shown in 510, immutable data, such as the data 220, 230, 240, 250 and 260 of FIG. 2B, for the enumeration type may be generated in data memory, such as the Data 170 of FIG. 1, for an application, in some embodiments. This immutable data may include a data object for each unique enumeration for the enumeration type, where within each individual data object a unique ordinal value associated with the respective enumeration may be stored, in some embodiments. In addition, in some embodiments the immutable data may also include a lookup table containing references to the individual data objects, where the lookup table may be indexed using the unique ordinal values assigned to the individual ones of the enumerations of the enumeration type.

In some embodiments, the immutable data may be generated in a statically allocated, pre-initialized portion of the application's memory. In some embodiments, this portion of memory may be read-only memory. In other embodiments, the immutable data may be generated in a dynamic portion of the application's memory, such as in a stack or heap.

As shown in 520, the source code for the application may indicate to store a particular enumeration of the declared enumeration type. To perform this store operation, an ordinal value of the particular enumeration may be stored in a location in memory rather than storing a reference to an object corresponding to the particular enumeration, in some embodiments.

As shown in 530, the source code for the application may indicate to load a particular enumeration of the declared enumeration type from the memory location. To perform this load operation, an ordinal value for the particular enumeration may in some embodiments be directly loaded, such as in the illustrative code of FIG. 4B, from the memory location rather than loading a reference to an object corresponding to the particular enumeration, then subsequently loading the ordinal value from the object, such as in the illustrative code of FIG. 4A.

FIG. 6 is a flow diagram illustrating conversion of a stored ordinal value of a space- and time-efficient enumeration to a reference to an object, in various embodiments. First, as shown in 600, it may be determined that a stored enumeration may be converted from an ordinal value to a reference to an object. In some embodiments, this may be performed by a compiler such as a Compiler 192 of a Software Development Platform 190 as shown in FIG. 1 while in other embodiments it may be performed within an application runtime such as by a Compiler 143 or Interpreter 144 as shown in FIG. 1.

A stored enumeration may need be converted from an ordinal value to a reference to an object for a variety of reasons, in some embodiments. For example, in some embodiments, a stored enumeration may be written to another memory location, where the other memory location may store references to a generic object type, such as in a union or a mixed collection of objects. In this case, other types of objects may still be stored as a reference, therefore, for consistency, the stored ordinal value for the enumeration may need conversion to a reference before storage in the new memory location. In another example, a method of the enumeration type may require execution, therefore a reference for the enumeration may be needed to identify the method for execution. In still another example, code external to the runtime of the application, such as Native Code 180 as shown in FIG. 1, may require access to the enumeration, such as Enumeration Data 172 of FIG. 1, via a native interface, such as the Native Interface 145 as shown in FIG. 1. As the native interface may not directly support space- and time-efficient enumerations, conversion of the stored enumeration to a reference to an enumeration object may be needed, in some embodiments. Furthermore, rather than native code accessing an enumeration through a native interface, a library, such as the Library 142 of FIG. 1, may not directly support space- and time-efficient enumerations. Therefore, accesses to library functions may also require conversion, in some embodiments.

As shown in 610, an ordinal value may be loaded from the memory location where the enumeration is stored, such as in the illustrative code of FIG. 4B. The loaded ordinal value may then be used as an index into a lookup table associated with the enumeration type 620, such as the lookup table 260 as shown in FIG. 2B. A reference to an object, such as objects 220, 230, 240 and 250 of FIG. 2B, may then be loaded from the lookup table using the loaded ordinal value as the lookup table index.

Figure 7:
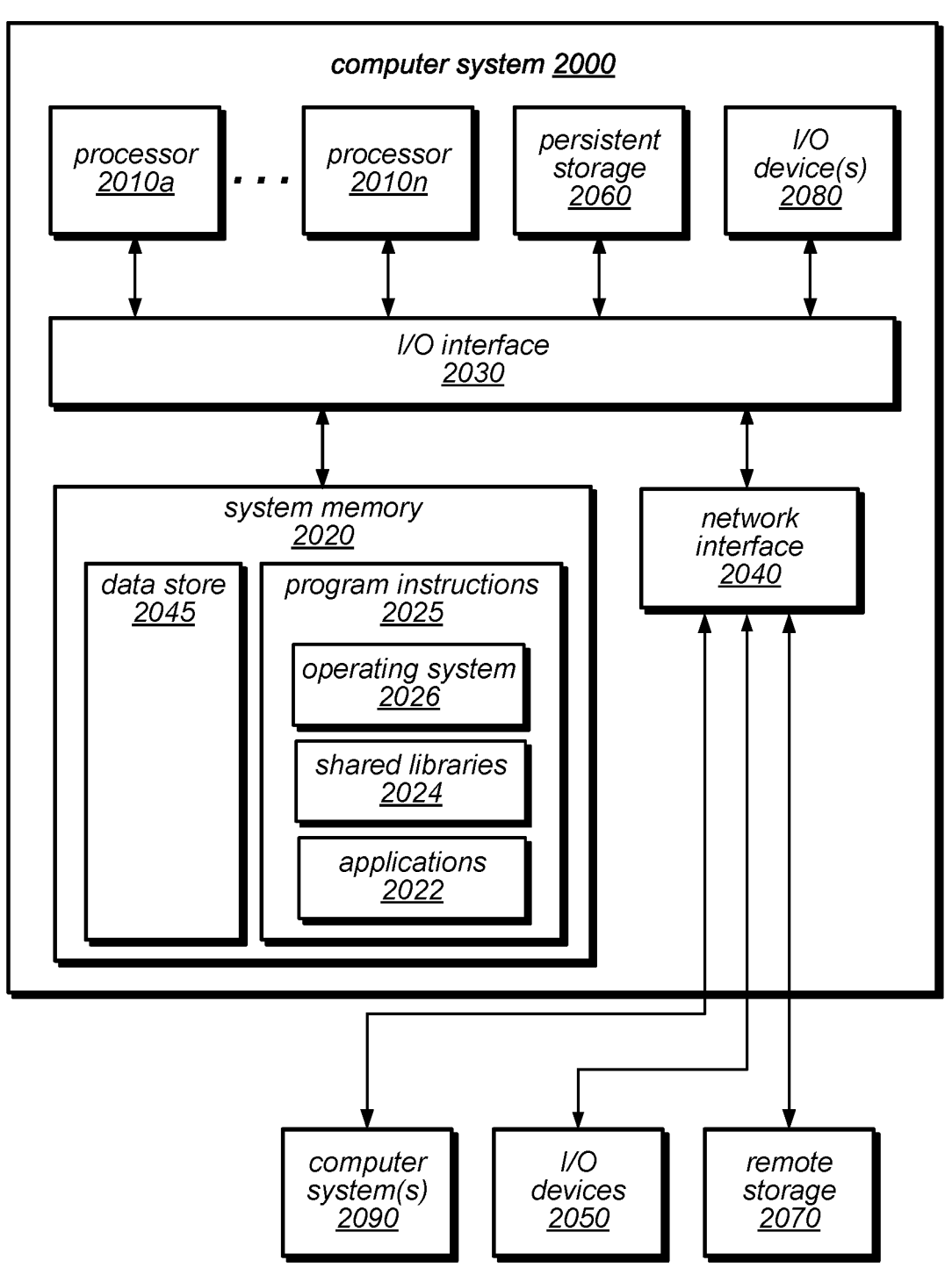
FIG. 7 is a block diagram illustrating one embodiment of a computing system that is configured to implement position-independent addressing modes, as described herein.

Various ones of the illustrated embodiments may include one or more computer systems 2000 such as that illustrated in FIG. 7 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for providing an operating system, as indicated at 2026, share libraries, as indicated at 2024, and applications, as indicated at 2022, are shown stored within system memory 2020 as program instructions 2025. These program instructions may be encoded in platform unmanaged binary, any interpreted language such as Java™ byte-code, or in any other language such as C/C++, the Java™ programming language, etc., or in any combination thereof. In various embodiments, applications 2022, operating system 2026, and/or shared libraries 2024 may each be implemented in any of various programming languages or methods or a combination of programming languages or methods. For example, in one embodiment, operating system 2026 may be based on the Java™ programming language, while in other embodiments it may be written using the C or C++ programming languages. Similarly, applications 2022 may be written using the Java™ programming language or another programming language or combination of programming languages according to various embodiments. Moreover, in some embodiments, applications 2022, operating system 2026, and/shared libraries 2024 may not be implemented using the same programming language or languages. For example, applications 1222 may be Java™ based, while shared libraries 2024 may be developed using C. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electro-magnetic, or digital signals, conveyed via a communication medium such as network and/or a wireless link.

Embodiments of decentralized application development and deployment as described herein may be executed on one or more computer systems, which may interact with various other devices. FIG. 6 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A computer-implemented method of accessing an object by reference, comprising:

obtaining an ordinal value of the object of a plurality of objects of an instantiated class, wherein individual objects, including the object, of the instantiated class respectively comprise a plurality of immutable items, and wherein the instantiated class comprises a plurality of different ordinal values including the ordinal value;

loading a memory address of the object from a location in a lookup table, the location identified using the obtained ordinal value as an index, wherein the memory address is different from the location in the lookup table, and wherein the lookup table comprises a plurality of memory addresses, including the memory address, respectively identified by individual ones of the plurality of different ordinal values; and accessing one or more of the plurality of immutable items of the object using the loaded memory address.

2. The computer-implemented method of claim 1, further comprising storing the reference to the object in a memory location containing a reference to an object type.

3. The computer-implemented method of claim 1, wherein accessing the object comprises performing a method lookup for the instantiated class.

4. The computer-implemented method of claim 1, wherein accessing the object is performed by one or more external methods via a native interface.

5. The computer-implemented method of claim 1, wherein a number of the plurality of different ordinal values is constant, and wherein a size of a memory location storing the ordinal value is less than a size of a memory location storing a reference to the object.

6. The computer-implemented method of claim 1, wherein the instantiated class is an enumeration class, wherein individual ones of the plurality of different ordinal values are enumeration values of the enumeration class, and wherein obtaining the ordinal value comprises loading, from a memory location, an enumeration of the enumeration class.

7. The computer-implemented method of claim 1, wherein the obtaining and loading are performed by a Java Virtual Machine.

8. One or more non-transitory computer-accessible storage media storing program instructions that when executed on or across one or more processors cause the one or more processors to perform:

obtaining an ordinal value of the object of a plurality of objects of an instantiated class, wherein individual objects, including the object, of the instantiated class respectively comprise a plurality of immutable items, and wherein the instantiated class comprises a plurality of different ordinal values including the ordinal value loading a memory address of the object from a location in a lookup table, the location identified using the obtained ordinal value as an index, wherein the memory address is different from the location in the lookup table, and wherein the lookup table comprises a plurality of memory addresses, including the memory address, respectively identified by individual ones of the plurality of different ordinal values; and accessing one or more of the plurality of immutable data items of the object using the loaded memory address.

9. The one or more non-transitory computer-accessible storage media of claim 8, storing additional program instructions that when executed on or across the one or more processors cause the one or more processors to perform:

storing the reference to the object in a memory location containing a reference to an object type.

10. The one or more non-transitory computer-accessible storage media of claim 8, wherein accessing the object comprises performing a method lookup for the instantiated class.

11. The one or more non-transitory computer-accessible storage media of claim 8, wherein accessing the object is performed by one or more external methods via a native interface.

12. The one or more non-transitory computer-accessible storage media of claim 8, wherein a number of the plurality of different ordinal values is constant, and wherein a size of a memory location storing the ordinal value is less than a size of a memory location storing a reference to the object.

13. The one or more non-transitory computer-accessible storage media of claim 8, wherein the instantiated class is an enumeration class, wherein individual ones of the plurality of different ordinal values are enumeration values of the enumeration class, and wherein obtaining the ordinal value comprises loading, from a memory location, an enumeration of the enumeration class.

14. The one or more non-transitory computer-accessible storage media of claim 8, wherein the obtaining and loading are performed by a Java Virtual Machine.

15. A system, comprising:

one or more processors and a memory comprising program instructions executable by the one or more processors to implement an application configured to:

obtain an ordinal value of the object of a plurality of objects of an instantiated class, wherein individual objects, including the object, of the instantiated class respectively comprise a plurality of immutable items, and wherein the instantiated class comprises a plurality of different ordinal values including the ordinal value;

load a memory address of the object from a location in a lookup table, the location identified using the obtained ordinal value as an index, wherein the memory address is different from the location in the lookup table, and wherein the lookup table comprises a plurality of memory addresses, including the memory address, respectively identified by individual ones of the plurality of different ordinal values; and access one or more of the plurality of immutable data items of the object using the loaded memory address.

16. The system of claim 15, wherein the application is further configured to store the reference to the object in a memory location containing a reference to an object type.

17. The system of claim 15, wherein accessing the object comprises performing a method lookup for the instantiated class.

18. The system of claim 15, wherein accessing the object is performed by one or more external methods via a native interface.

19. The system of claim 15, wherein the instantiated class is an enumeration class, wherein individual ones of the plurality of different ordinal values are enumeration values of the enumeration class, and wherein obtaining the ordinal value comprises loading, from a memory location, an enumeration of the enumeration class.

20. The system of claim 15, wherein the obtaining and loading are performed by a Java Virtual Machine.

\* \* \* \* \*